F. C. MARTIN.
ROACH TRAP.
APPLICATION FILED MAY 18, 1916.
1,192,334.
Patented July 25, 1916.
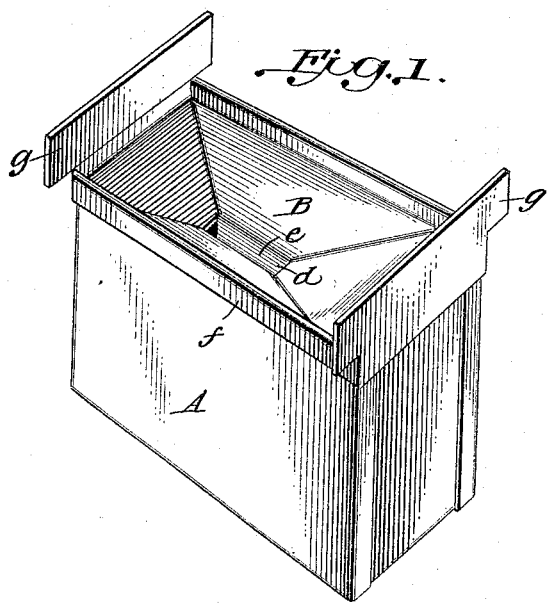
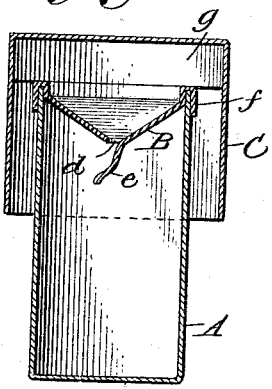
Inventor:
Ferdinand C. Martin.
Witnesses
Lucia O. Martin
Ferdinand Post

UNITED STATES PATENT OFFICE.

FERDINAND C. MARTIN, OF NEWBERRY, SOUTH CAROLINA.

ROACH-TRAP.

1,192,334.          Specification of Letters Patent.      Patented July 25, 1916.

Application filed May 18, 1916. Serial No. 98,436.

*To all whom it may concern:*

Be it known that I, FERDINAND C. MARTIN, a citizen of the United States, residing at Newberry, in the county of Newberry, and in the State of South Carolina, have invented new and useful Improvements in Roach-Traps, of which the following is a specification.

My invention is clearly illustrated in the accompanying drawings which, with the letters of reference marked thereon, form a part of this specification and in which—

Figure 1, is a view of my improved trap with its harboring hood removed. Fig. 2, is an end sectional view thereof.

Like reference letters indicate corresponding parts in the two figures of the drawings.

Referring to the drawings, it will be observed that this improved roach-trap consists of three sections A, B, and C, which may be constructed of metal or glass, excepting C, which may be constructed of pasteboard or other suitable material.

In Fig. 1, A, is an oblong box, B, is a lid for same with an incline inward and downward from all four sides in the form of a chute, with a long and very narrow opening $d$, at the bottom of the chute for the roaches to fall through into the box A. $e$, is an extended curved flange which passes under the opening $d$, which permits the roaches to enter but making it impossible for them to escape by flight; the slope of the chute and its smooth surface makes it impossible for them to escape by crawling; $f$, is a rim of the lid or chute B, which holds it securely to the box A, when pressed together, and may be made to press together on the inside of the box or on the outside.

C, is a harboring hood, which covers both A, and B, as in Fig. 2.

In Fig. 1, $g$, and $g$, are wings which are wider than the chute B, and are for the purpose of holding the harboring hood, they may be permanently attached to B, or may be made removable.

A, is to be painted on the outside or otherwise made suitable for the roaches to crawl up.

This improved roach-trap is used in the following manner: The two upper sections C, and B, are removed and a piece of bait is inserted and the two sections A, and B, are placed together again, then section C, is placed over both sections A, and B, as in Fig. 2, the insects, to get the bait will pass up the outside of the box A, and will slide down the chute B, through the opening $d$, into the box A. The harboring hood C, is for the purpose of luring the roaches into the trap as a hiding place thereby trapping them even though there were no bait in the trap. The harboring hood C, is wider than sections A, and B, allowing space for the roaches to crawl up. To remove the roaches, separate sections A, and B, and the roaches may be emptied out.

I am aware there are traps similar to mine, but the improvement of this trap over others of its kind is, its long narrow opening $d$, and its extended curved flange $e$, which passes under the opening $d$, and makes it impossible for roaches of flight to escape. Also the harboring hood C, which makes the trap suitable to catch roaches without the use of bait.

What is claimed as new is—

A roach-trap oblong in shape and comprised of three sections, the lower section being in the shape of an oblong box with its exterior surface painted or otherwise made suitable for the roaches to crawl up; the middle section being a lid for same in the shape of a chute sloping inward and downward from all four sides with a long narrow opening at the bottom of the chute, also having an extended curved flange which passes under the said narrow opening, said middle section having a rim which holds the middle and lower sections together; it also having two wings which hold up the upper section which is in the shape of an oblong box but wider and longer than the rest of the trap.

In testimony whereof I have affixed my signature in the presence of two witnesses, this 17th day of April, 1916.

FERDINAND C. MARTIN.

Witnesses:
  LUCIA E. MARTIN,
  FERDINAND POST.